United States Patent [19]
Diehl

[11] Patent Number: 5,957,215
[45] Date of Patent: Sep. 28, 1999

[54] APPARATUS FOR PREPARING OF A GROUND SURFACE OF AN ARENA

[76] Inventor: Georg Michael Diehl, Oeserstr. 80, D-65934 Frankfurt am Main, Germany

[21] Appl. No.: 08/860,342
[22] PCT Filed: Oct. 25, 1995
[86] PCT No.: PCT/EP95/04189
  § 371 Date: Jun. 24, 1997
  § 102(e) Date: Jun. 24, 1997
[87] PCT Pub. No.: WO97/15180
  PCT Pub. Date: May 1, 1997
[51] Int. Cl.$^6$ .................................................. A01B 69/00
[52] U.S. Cl. ................................ 172/26; 172/35; 172/292
[58] Field of Search .......................... 172/26, 26.5, 26.6, 172/33, 35, 292, 23; 37/399, 400, 401, 104

[56] References Cited

U.S. PATENT DOCUMENTS

| | | | |
|---|---|---|---|
| 1,394,651 | 10/1921 | Tompkins | 172/26 |
| 2,957,254 | 10/1960 | Bederman et al. | 172/33 X |
| 3,186,493 | 6/1965 | Barry | 172/26 |
| 3,264,667 | 8/1966 | Frank | 172/26 X |
| 3,702,638 | 11/1972 | Takata | 172/540 |
| 3,744,586 | 7/1973 | Leinauer | 172/26 X |
| 4,059,911 | 11/1977 | Bean et al. | 172/25 X |
| 4,284,273 | 8/1981 | Gansewig | 172/26 X |
| 4,440,091 | 4/1984 | Burgess | 172/26 X |
| 4,612,996 | 9/1986 | Wolf et al. | 172/26 |
| 4,819,738 | 4/1989 | Fountain | 172/292 |
| 4,821,809 | 4/1989 | Summach et al. | 172/179 |

FOREIGN PATENT DOCUMENTS

| | | |
|---|---|---|
| 2443189 | 12/1979 | France . |
| 1582784 | 5/1970 | Germany . |
| 2150519 | 4/1973 | Germany . |
| 3605493 | 8/1987 | Germany . |

OTHER PUBLICATIONS

Glencoe Soil Finisher brochure, pp. 1–6.
Midwest Lift Harrow brochure, pp. 1–4.
Kasco Switch Hitch brochure, p. 1.

*Primary Examiner*—Victor Batson
*Attorney, Agent, or Firm*—Brown & Wood, LLP

[57] ABSTRACT

The invention relates to a device for reconditioning the ground area of an arena in a riding hall or in an open riding course, which the device comprises a chassis which spans the breath of the ground area and can be moved lengthwise backwards and forwards. The chassis comprises vertically adjustable tools for preparing and leveling the ground area while the chassis is moving, with a device for dampening the ground area from a low level.

31 Claims, 4 Drawing Sheets

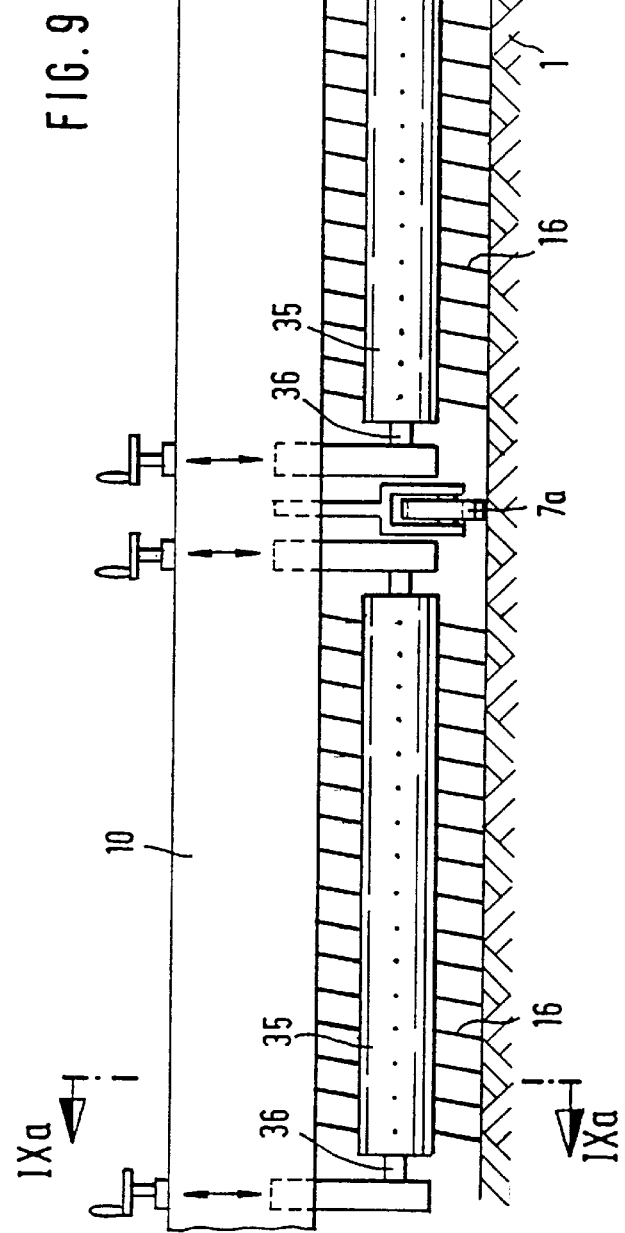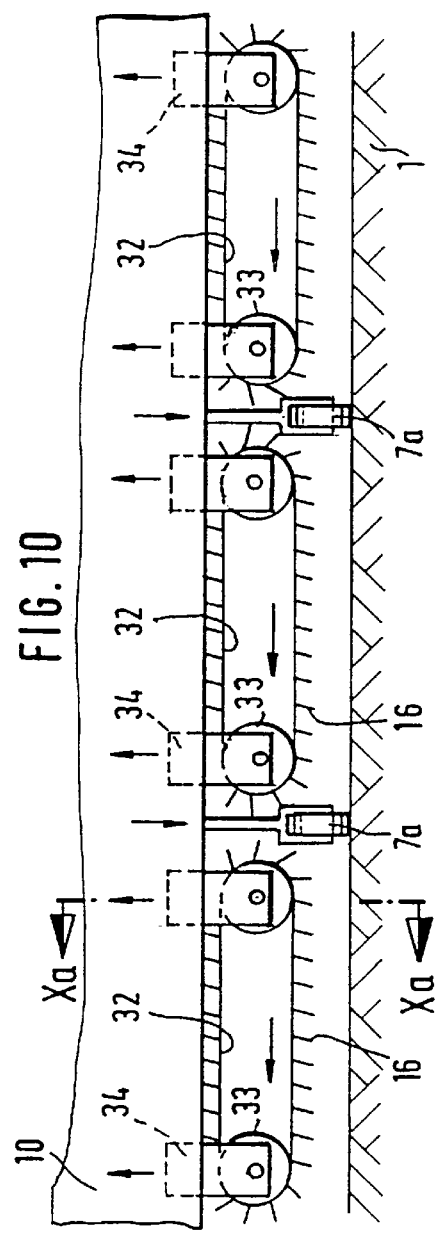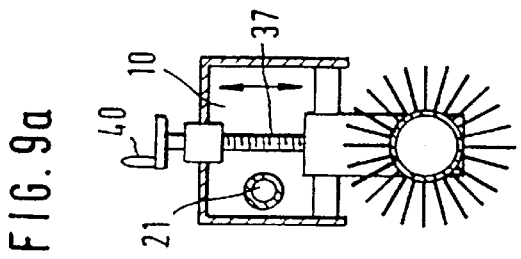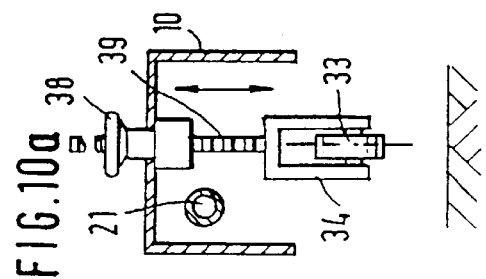

APPARATUS FOR PREPARING OF A GROUND SURFACE OF AN ARENA

The invention relates to an apparatus for preparing a ground area of an arena of a riding hall or of an open riding course.

The ground area of an arena, as a rule, consists of sand, peat or wood shavings, or a mixture of these components. They are first subjected, in exercise arenas, to lasting loads because of horse kicks. This results in that the peat, sand or wood shavings accumulate on longitudinal or transverse sides as well as in the corners of any arena, which leads to damaging unevenness of the arena. The riding operation must then be interrupted in order to effect levelling of the ground area. To this end, usually, a harrow is used which is pulled by a tractor.

This method takes relatively a lot of time, especially when a large amount of the ground accumulated which has to be divided and levelled.

In addition, the air in the riding hall remains contaminated for a relatively long time with the tractor exhaust gasses.

A further damage of the ground results from its drying which disrupts the riding operation because of the troublesome dust. To prevent the formation of dust, the ground is wetted. In the simplest case, it is effected by spraying, using a water hose. In many cases, however, for spraying the ground, sprinkler devices are provided over the arenas. In a riding hall thereby a wet tropical climate is generated, without enough water, which is sprayed beneath the hall roof, being on the ground. The latter is often so dry that it does not pick up the sprayed water.

Accordingly, the object of the present invention is to provide a possibility which would enable a more intensive and more rapid preparation of the ground, without a lasting disruption of the riding operation.

It was found that this object is achieved in a simple manner with an apparatus which includes a chassis spanning the width of the ground area and which moves to and fro in a longitudinal direction of the ground area and includes vertically adjustable tools for preparing and levelling the ground during the movement of the chassis, and which apparatus further includes a device for wetting the ground area from a low height.

By this combination of the chassis, which includes vertically adjustable tools for preparing the ground, and of the device for wetting the ground, the ground area of the arena can be evened without trouble and time loss.

A particular advantage consists in that the ground during its mechanical preparation, is sprayed with water from a low height. This permits to achieve an intensive wetting of the peat, sand, wood shavings, or a mixture of these components, without generating, during the ground preparation, a noticeable amount of dust and without generating an unacceptable damped climate by the spray water.

The particularities of the invention are given in subclaims. The chassis consists of two running gears with wheels and cross-connectors which connect the running gears with each other.

Each running gear consists of a frame and two wheels which can be formed as pure running wheels. For them, simple tracks, e.g., from cement, can be provided along longitudinal sides of the ground area. In the simplest case, the running gear can run along side regions of the ground area.

In other embodiments, rail running wheels can be used which run along the respective rails and are guided by them.

A usual width of an arena is 20 meters. The chassis, which spans the entire width of the arena, should therefore be stable in order to be able to withstand, during the preparation, loads acting transverse to the movement direction, without the reduction of its service life. For this reason, at least one support roller is provided beneath the cross-connectors for taking up the weight of the ground preparation device when the latter is moved in a lifted condition.

Under circumstances, it is sufficient when one cross-connector is respectively provided. However, a particularly reliable chassis with a long service life are obtained when two parallel rolled section beams, web plate beams or lattice girders are used. A box girder, beside a good stability, has an additional advantage consisting in that the ground preparation device and the ground wetting device can be arranged in the box girder which insure their protection.

In the first embodiment of the invention, the chassis is driven by at least one tow arrangement adjacent to a longitudinal side of the ground area. A driver connects the chassis with the driving strand of the arrangement. The tow arrangement is connected with driving and deflection wheels provided, respectively, at the ends of the longitudinal side of the ground area.

The tow arrangement can be located beneath an elongate band. However, it can also be located inside a channel provided beneath the ground surface. In the latter case, the channel region, e.g., at gate area, have covers. It is recommended to connect the chassis to both sides of the tow arrangements to insure a synchronized operation of both running gears, which permits the use of simple running gears.

When one or two opposite tow arrangement cannot be used, e.g., because of a specific construction of an arena, the chassis includes a self-contained drive which includes at least one electric drive motor which is flange-mounted on a running gear and is operatively connected with the running gear by toothed gears. According to the invention, it is possible to connect each running gear of a chassis with an electric drive motor. Thereby a synchronized operation of both running gears is insured.

However, when only one running gear is combined with a moving drive, then both running gears can be operatively connected by a synchronizing device.

The self-contained drive can include a central drive motor, a coupling, a shaft, and toothed gears connected with a wheel of at least one running gear. The central drive motor can be located approximately in the middle of the chassis and drive a shaft drivingly connected either only with one running gear or with both running gears. In the latter case, a synchronized operation of both running gears is automatically provided.

The advantage of providing a self-contained drive in a chassis consists in that the apparatus can be completely delivered, without a necessity of additional work, e.g., for an installation of a tow arrangement.

It is advantageous, in particular with a one-sided drive of the chassis, to form tracks of rails and to use the rail running wheels as running wheels, which provides for guiding of the chassis.

It has been found that optimal preparation and levelling of the ground can be achieved with tines.

The tines are mounted on chains which run about sprocket gears in a direction transverse to the movement direction of the chassis. When the sprocket wheel shafts extend parallel to the longitudinal sides of the ground area, only the tines on one strand of the chain prepare the ground.

The other return strand of the endless chain runs above the operational strand.

The ground is prepared with tines of both strands of an endless chain, when the tines of one strand move through the ground in one direction, and the tines of another strand move through the ground in the opposite direction.

This permits to achieve a particularly good preparation and levelling of the ground.

In an advantageous embodiment, four chains are mounted on a chassis which, with respective drive motors, form single unit blocks. These blocks can be vertically adjusted above the ground area independently of each other. In the lower position, the tines engage the ground whereas in the upper position, there is no contact between the tines and the ground.

The tines can be arranged on outer surfaces of drums which are mounted on shafts extending transverse to the movement direction and which are combined, together with a drive motor, in a block. In the preferred embodiment, four drum blocks are mounted on a chassis which also are vertically adjustable.

The chains or drums are in their upper position, when the chassis is to be moved above the ground surface of the arena.

The tines are resiliently mounted on the chains or the outer drum surfaces.

The driving of the chains and the drums can be effected from the chassis drive via toothed or bevel wheels, preferably the driving of each chain and each drum is effected by a separated motor.

For wetting the ground, a device with a lance is used.

The embodiments of the invention will now be described below with reference to the drawings. In the drawings:

FIG. 9 is a schematic view of a drum arrangement beneath the chassis;

FIG. 9a is a cross-sectional view along line ÎXa—ÎXa in FIG. 9;

FIG. 10 is a schematic view of a chassis with a chain; and

FIG. 10a is a cross-sectional view along line Xa—Xa in FIG. 10.

FIGS. 1 and 2 show a first embodiment of the invention, with FIG. 1 showing a plan view of a first embodiment of the inventive apparatus and FIG. 2 showing a cross-sectional view along line II—II in FIG. 1.

The tracks for the chassis, which are formed as rails 3a, are placed on a ground area 1 of an arena along longitudinal sides of the ground area 1.

Figure 1:
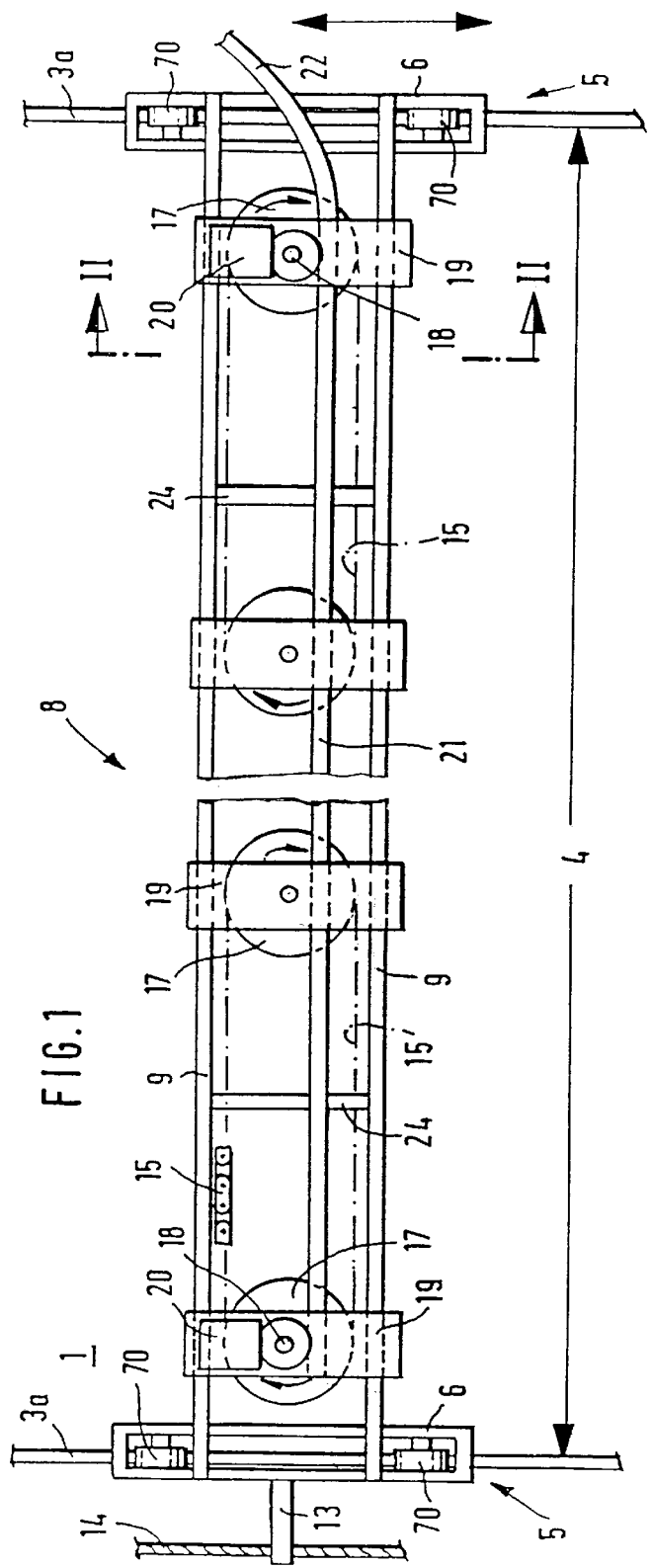
FIG. 1 is a plan view of a first embodiment of the invention.

A chassis, which is designated with a reference numeral 8, is supported on the rails 3a and is displaceable on the rails 3a to and fro along the double arrow which is shown at the right side of FIG. 1.

In the shown embodiment, the chassis 8 has a plurality of cross-beams which are formed as web plate beams and extend parallel to each other and in spaced relationship toward each other. The end of each cross-beam 9 is fixedly connected with running gears 5. The cross-beams 9 span the width 4 of the ground area which usually equals 20 m.

For this reason, the cross-beams 9, 9a, 10 and 11 should have a high flexural strength and be reliably secured to the running gears. Each of the running gears 5 has a frame 6 which, as can be seen in FIGS. 3 to 5, can be formed of U-shaped beams.

Running wheels 70 which, as can be seen in FIGS. 1, 2 and 4–7, can be formed as rail running wheels, are arranged between front and rear frame regions.

As can be particularly seen in FIGS. 9 and 10, the chassis can be further supported by support rollers 7a at one or more locations of the cross-beams.

Figure 2:
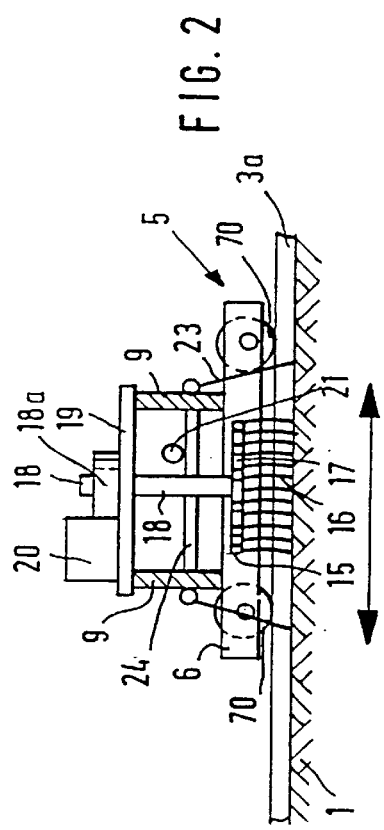
FIG. 2 is a cross-sectional view along line II—II in FIG. 1.
Figure 3:
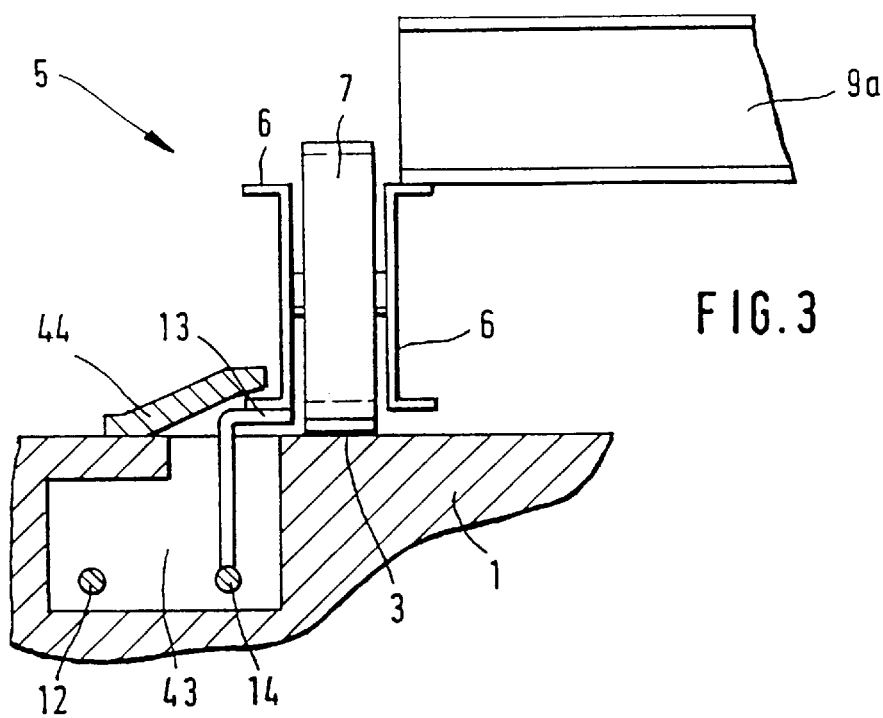
FIG. 3 is a partial cross-sectional view of a running gear with running wheels and a cross-beam, and a tow line beneath the ground area.
Figure 4:
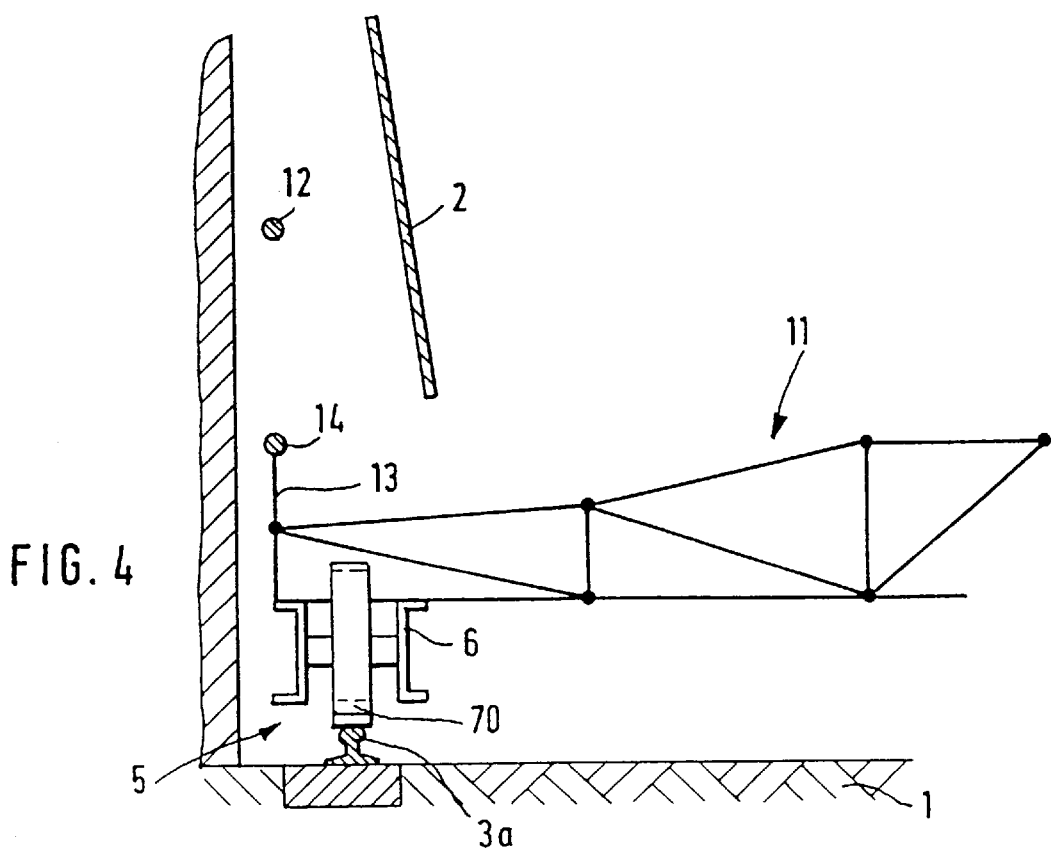
FIG. 4 is a partial cross-sectional view of a running gear with a rail running wheel and a tow arrangement beneath a band.
Figure 5:
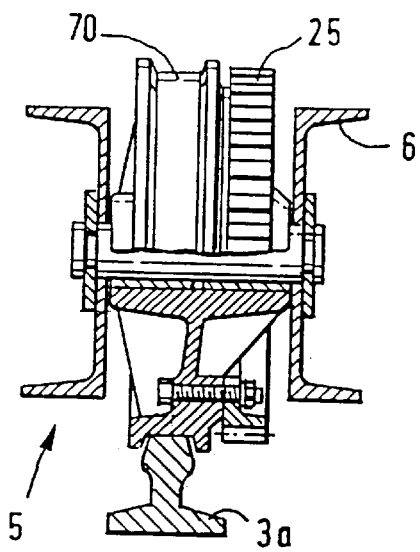
FIG. 5 is a rail running wheel connected with a toothed wheel in a running gear.

In the embodiment according to FIGS. 1–4, the drive of the chassis 8 is effected by at least one tow arrangement which consists of a return strand 12 and a driving strand 14 with which a driver 13, which is secured to one of two chassis 8, is connected. The tow arrangement can be arranged in a channel 43 beneath the ground area 1, as shown in FIG. 3, but it also can be located under an elongate band 2 as shown in FIG. 4. According to FIG. 4, rails 3a are arranged beneath the elongate band 2, so that the drive of the chassis 8 and the rails 3a can be arranged in the ground area without being disturbed.

FIG. 3 shows that in the frame 6 of the chassis 8, a conventional running wheel can be arranged. This running wheel 7 is not guided by the rails 3a, as is the case with rail running gears 70. When conventional running wheels 7 are used, it is recommended to connect each running gear 5 with a tow arrangement 12, 13, 14 to prevent jamming of the chassis 8 during its movement. The running wheels 7 run along simple tracks 3.

In the embodiment according to FIG. 3, the return strand 12 and the driving strand 14 of the tow arrangement run next to each other in the channel 43 and are guided about not shown drive and deflection wheels at the channel ends. Contrary to that, the return strand 12 and the drive strand 14 according to FIG. 4 are arranged one above the other behind the band 2. Correspondingly, not shown drive and deflection wheels are also provided.

The construction, in particular of a riding hall, in many cases does not permit mounting of the tow arrangements 12, 13, 14 along side edges of the ground area. In particular, this can be a case when gates are formed in the side walls of a riding hall.

In order to avoid making extensive structural changes on or in a riding hall under certain circumstances, the chassis 8 can be provided with a self-contained drive. In the first embodiment, one of the running gears 5 or each running gear can be combined with a toothed wheel 25 which is screwed with a running wheel 7 or a rail running wheel 70 in per se known manner. Such a toothed wheel 25 is one of the premisses for making self-propulsion of the chassis 8 operable. FIG. 5 shows a connection of a rail running wheel 70 with a toothed wheel 25. Without changing the essence of the invention, a conventional running wheel 7 can be associated with a toothed wheel 25.

Figure 6:
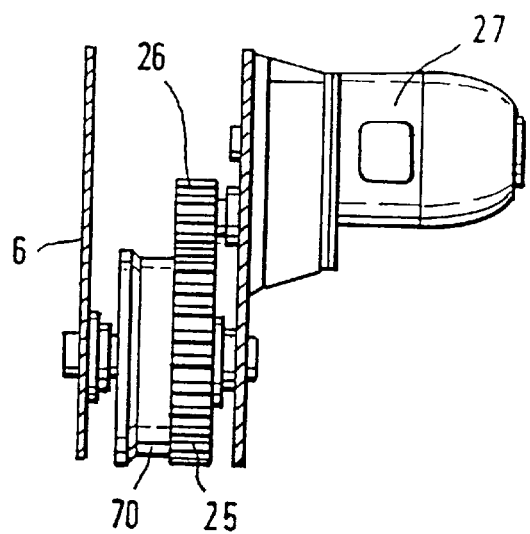
FIG. 6 is an attachment of a self-contained drive to a running gear.

FIG. 6 shows a first embodiment. A drive motor 27, which drives the toothed wheel 25 via a pinion 26, is flange-mounted on a side of the running gear 5, preferably, on its inner side. A drive motor 27 can be flange-mounted on both running gears 5 of the chassis 8. Thereby, an almost ideal synchronization of operation of both running gears is insured.

Figure 7:
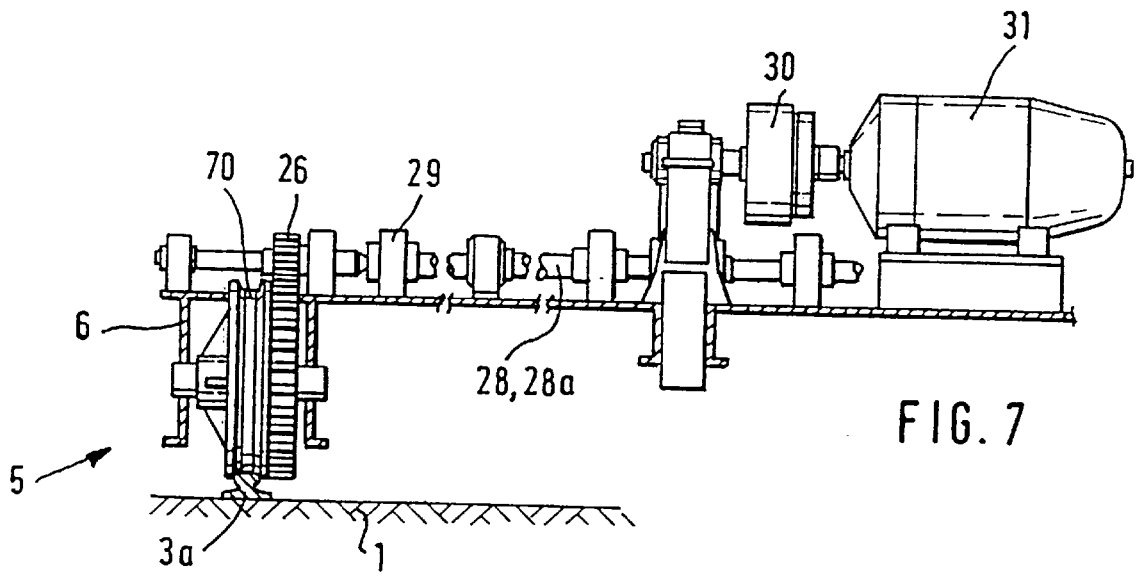
FIG. 7 is a schematic view of a self-contained drive for the chassis.

A further possibility of self-propulsion of the chassis 8 is shown schematically in FIG. 7. A pinion 26 drivingly connects the toothed wheel 25, which is screwed with a wheel 7,70, with a shaft 28. The shaft 28 is supported in shaft bearings 29 provided, e.g., in the cross-beams 9, 9a, 10, 11 over the entire width of the chassis 8. A gear transmission and a coupling 30 connect the shaft 28 with a central drive motor 31.

A synchronized operation of both running gears is insured when the shaft 28 is drivingly connected with both running gears 5.

When, however, only one of the running gears 5 is drivingly connected with a drive motor 27, as shown in FIG. 6, there can be provided a shaft 28a which insures a driving connection with the opposite running gear 5. The synchronized operation of both running gears 5 is insured by such a synchronizing intermediate shaft 28a which is supported in shaft bearings 29 in the cross-beams 9, 9a, 10, 11.

As shown in FIG. 2, the ground area reconditioning tools include chains 15 having spring tines 16 attached thereto. The chains 15, as shown in FIG. 1, span substantially the entire width of the ground area. Each chain 15 is driven by sprocket wheels 17 supported in shafts 18. The shafts 18 are supported in supports 19. A geared motor 20 is provided on each of the supports 19, as shown in FIG. 2, which drives the shaft 18 via a reducing gear 18a.

The motor 20 drives the chains in the direction indicated by an arrow so that the spring tines 16 on the lower strands of chains 15 graze the ground to the left, and the spring tines 16 on the upper strands of the chains 15 graze the bottom to the right. Thereby, an effective treatment of the ground area 1 and levelling of the ground is effected.

A lance 21, which is connected to a water hose 22, is arranged above the chains 15 and extends along longitudinal sides also substantially along the entire width of the ground area. For simplicity sake, valves for turning on and off the spray water are not shown.

The cross-sectional view according to FIG. 2 shows that the shown embodiment includes pivotal levelling elements 23 which are arranged on both cross-beams 9 and which provide for levelling of the ground area 1, completing the preparation of the ground effected with spring tines 16. The levelling elements 23 are combined with an adjustment mechanism, not shown.

The lance 21 is secured to a tubular girder 24 extending transverse between the cross-beams 9.

FIG. 4 shows a cross-beam, which is formed as a lattice girder 11 and parallel to which, according to FIG. 1, a further lattice girder can extend as a cross-beam. Units formed of chains 15, sprocket wheels 17 and drive motors 20 and not shown in FIG. 4, are provided between the cross-beams 11.

Figure 8:
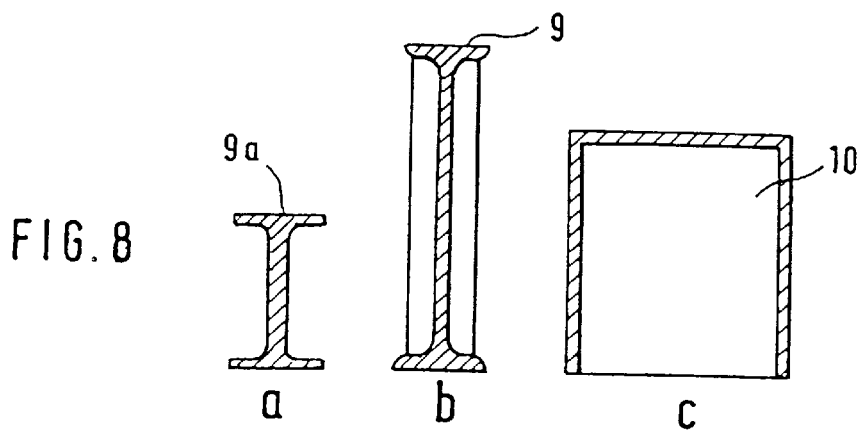
FIG. 8 is different cross-sections of cross-beams.

FIG. 8 shows schematically a cross-section of other cross-beams. The cross-beam 9a is formed as a rolled section. The cross-beam 10 is formed as a box girder. According to the invention, both running gears 5 may be connected with each other by cross-beams 9 and/or 9a or 11. However, from the stability point of view, it is preferred to use two parallel cross-beams 9, 9a or 11.

The advantage of the box girder 10 according to FIG. 8c consists in that it has a larger stability and in that the chain drive and the chains 15 can be received in the box girder interior.

The height adjustment of the chains 15 with respect to the ground area 4 is achieved with known means which is provided between units which include chains 15, sprocket wheels 17 and motor supports or support 19, and the cross-beams 9, 9a, 10 and 11. The height adjustment of the chains 15, together with sprocket wheels 17 and the supports 19, can be effected with manual or power spindle drives but also with rack-and-pinion gear drives which are manually actuated. Without changing the essence of the invention, pneumatic or hydraulic devices can be used for effecting height adjustment.

FIGS. 9 and 10 show further tools for preparing and levelling the ground area 1. Beneath the cross-beams 9, 9a, 10 and 11, drums can be supported on shafts 36, the bearing 34 of which are height-adjustably arranged beneath the cross-beams 9, 9a, 10 and 11. FIG. 9a shows a cross-section along line IXa—IXa in FIG. 9. Here, it is shown schematically that the shafts 36 of drums 35 are supported in bearings 34 which can be displaced downwards and upwards by a spindle 37 driven with a crank 40 or a hand wheel (not shown in FIG. 9a).

Usually, four drums 35 are arranged on the chassis 8 in a manner described above. Driving of the drums can be effected from electromotors, not shown, via bevel gear drives or chain drives.

In cross-sectional view of FIG. 9a, a chain support 10, which is formed as a cross-beam, is shown.

FIGS. 10 and 10a show that chains 32, which run about sprocket wheels 33, can be located beneath the cross-beams 9, 9a, 10 and 11. The driving of the sprocket wheels can be effected by electromotors, not shown. Also, in the embodiment shown in FIGS. 10 and 10a, lifting and lowering of the chains 32 can be effected with above-described spindle drives, however, racks can also be used.

For effecting the height-adjustment of the tool, a pneumatic or hydraulic drive can be used, without changing the essence of the invention.

If the shown apparatuses or chassis are provided with front and rear covers, the chassis 8 can be put in as movable bands with which the arena can be divided in areas of a predetermined size.

| List of Used Reference Numerals | |
|---|---|
| 1 | Ground Area |
| 2 | Band |
| 3 | Track |
| 3a | Rail |
| 4 | Width of the Ground Area |
| 5 | Running Gear |
| 6 | Frame |
| 7 | Running Wheel |
| 70 | Rain Running Gear |
| 8 | Chassis |
| 9 | Cross-Beam/Web Channel Beam |
| 9a | Cross-Beam/Rolled Section Beam) |
| 10 | Cross-Beam (Box Girder) |
| 11 | Cross-Beam (Latice Girder) |
| 12 | Return Strand |
| 13 | Driver |
| 14 | Driving Strand |
| 15 | Chain |
| 16 | Spring Tine |
| 17 | Sprocket Wheel |
| 18 | Shaft |
| 19 | Motor Support |
| 20 | Geared Motor |
| 21 | Lance |
| 22 | Water Hose |
| 23 | Equalizing Element |
| 24 | Tubular Girder |
| 25 | Toothed Wheel |

-continued

List of Used Reference Numerals

| | |
|---|---|
| 26 | Pinion |
| 27 | Drive Motor |
| 28 | Shaft |
| 28a | Synchronizing Shaft |
| 29 | Shaft Bearing |
| 30 | Coupling |
| 31 | Central Drive Motor |
| 32 | Chain |
| 33 | Sprocket Gear |
| 34 | Bearing |
| 35 | Drum |
| 36 | Shaft |
| 37 | Spindle |
| 39 | Tooth Rack |
| 40 | Crank |
| 41 | Hydraulic or Pneumatic Drive |
| 42 | Drivable Band |
| 43 | Channel |
| 44 | Cover of the Channel |

I claim:

1. An apparatus for preparing a ground area (1) of an arena in a riding hall or of an open riding course, characterized by a chassis (8) spanning the width (4) of the ground area (1), movable to and fro in a longitudinal direction of the ground area (1) and including vertically adjustable tools (15, 16, 28, 32, 35) attached to the chassis (8) and likewise spanning substantially the width (4) of the ground area (1) for preparing and levelling the ground area (1) during movement of the chassis; and means attached to the chassis (8) (21, 22, 24) for wetting the ground area (1) from a low height and spanning the width (4) of the ground area (1), wherein the chassis (8) consists of two running gears (5) and cross-connectors (9, 9a, 10, 11) which connect the running gears (5) with each other, and wherein the chassis (8) is connected with a driving strand (14) of a tow arrangement (12, 14), which is located adjacent to a longitudinal side of the ground area, by at least one driver (13).

2. An apparatus according to claim 1, characterized in that the tow arrangement includes one of endless cable and endless rope having a driving strand (14) and a return strand (12), and a driving wheel and a deflection wheel located at ends of a longitudinal side of the ground area, respectively.

3. An apparatus according to claim 1, characterized in that the at least one tow arrangement (12, 13, 14) is arranged beneath a band (2).

4. An apparatus according to claim 1, characterized in that the tow arrangement (12, 13, 14) is located in a channel provided beneath the ground area (1).

5. An apparatus according to claim 4, characterized in that the channel for the tow arrangement (12, 13, 14) in a region of a cross-over to the ground area (1) is covered with a cover.

6. An apparatus according to claim 1, characterized in that said two running gears (5) of the chassis (8) are operationally connected with each other by an equalizing device (25, 26, 28a).

7. An apparatus for preparing a ground area (1) of an arena in a riding hall or of an open riding course, characterized by a chassis (8) spanning the width (4) of the ground area (1), movable to and fro in a longitudinal direction of the ground area (1) and including vertically adjustable tools (15, 16, 28, 32, 35) attached to the chassis (8) and likewise spanning substantially the width (4) of the ground area (1) for preparing and levelling the ground area (1) during movement of the chassis; and means attached to the chassis (8) (21, 22, 24) for wetting the ground area (1) from a low height and also spanning the width (4) of the ground area (1), wherein the tools includes tines (16) movable through the ground area (1) during movement of the chassis (18) and mounted on chains (15, 32) which run about sprocket wheels (17–31) transverse to a movement direction of the chassis.

8. An apparatus according to claim 7, characterized in that the sprocket wheels C (33) are mounted on shafts extending parallel to longitudinal sides of the ground area (1).

9. An apparatus according to claim 7, characterized in that the tines (16) are mounted on an outer surface of a drum mounted on a shaft (36) extending transverse to a movement direction.

10. An apparatus according to claim 7, characterized in that the tines (16) are resiliently supported on the chains (15,32) or drums (35).

11. An apparatus according to claim 10, characterized in that the chains (15,32) or the drums (35) are mounted in the chassis (8) with a possibility of vertical adjustment.

12. An apparatus according to claim 11, characterized in that spindle drives (37,38) are provided for height adjustment of the chains (15,32) or the drums (35).

13. An apparatus according to claim 11, characterized in that rack-and-pinion drives (39,40) are provided for height adjustment of the chains (15,32) or the drums (35).

14. An apparatus according to claim 11, characterized in that pneumatic or hydraulic drives (14) are provided for height adjustment of the chains (15,32) or the drums (35).

15. An apparatus according to claim 10, characterized in that the driving of the chains (15,32) or the drums (35) is effected by electromotors (22).

16. An apparatus for preparing a ground area (1) of an arena in a riding hall or of an open riding course, characterized by a chassis (8) spanning the width (4) of the ground area (1), movable to and fro in a longitudinal direction of the ground area (1) and including vertically adjustable tools (15, 16, 28, 32, 35) attached to the chassis (8) and likewise spanning substantially the width (4) of the ground area (1) for preparing and levelling the ground area (1) during movement of the chassis; and means attached to the chassis (8) (21, 22, 24) for wetting the ground area (1) from a low height and also spanning the width (4) of the ground area (1), and wherein said wetting means includes a lance (21) arranged on the chassis (8) and connected with a water hose (22) extending along a longitudinal side of the ground area (1).

17. An apparatus according to claim 16, characterized in that the chassis (8) consists of two running gears (5) and cross-connectors (9, 9a, 10, 11) which connect the running gears with each other.

18. An apparatus according to claim 17, characterized in that each running gear (5) includes a frame and two wheels (7, 70).

19. An apparatus according to claim 18, wherein the wheels are formed as running wheels (7).

20. An apparatus according to claim 18, characterized in that the wheels are formed as rail running wheels (70) which run on rails (3) adjacent to longitudinal sides of the ground area (1) and are guided by the rails.

21. An apparatus according to claim 18, characterized in that the chassis (8) is combined with a self-contained drive (27,31).

22. An apparatus according to claim 21, characterized in that the self-contained drive includes at least one electric drive motor (27) flange-mounted on the running gear (5) and drivingly connected with one wheel (7,70) of the running gear (5) by a toothed wheel (25).

23. An apparatus according to claim 21, characterized in that the self-contained drive includes a central drive motor (31), a coupling (30), a shaft (28), toothed wheels (25,26) connected with a wheel (7) of at least one of said two running gears (5).

24. An apparatus according to claim 17, characterized in that at least one support roller (7a) is arranged beneath the cross-connectors (9, 9a, 10, 11).

25. An apparatus according to claim 16, characterized in that a rolled profile support (9a) is used as a cross-connector.

26. An apparatus according to claim 16, characterized in that a web plate support (9) is used as a cross-connector.

27. An apparatus according to claim 16, characterized in that a box girder (10) is used as a cross-connector.

28. An apparatus according to claim 16, characterized that at least one lattice girder (11) is used as a cross-connector.

29. An apparatus for preparing a ground area (1) of an arena in a riding hall or of an open riding course, characterized by a chassis (8) spanning the width (4) of the ground area (1), movable to and fro in a longitudinal direction of the ground area (1) and including vertically adjustable tools (15, 16, 28, 32, 35) attached to the chassis (8) and likewise spanning substantially the width (4) of the ground area (1) for preparing and levelling the ground area (1) during movement of the chassis; and means attached to the chassis (8) (21, 22, 24) for wetting the ground area (1) from a low height also spanning the width (4) of the ground area (1), wherein the chassis (8) consists of two running gears (5) and cross-connectors (9, 9a, 10, 11) which connect the running gears (5) with each other, and wherein a pivotal levelling element (23) is provided on one of the cross-connectors (9, 9a, 10, 11).

30. An apparatus according to claim 7, characterized in that the sprocket gears (17) are mounted on shafts (18) extending vertically to the ground area.

31. An apparatus according to claim 29, characterized in that a plurality of the chains (15, 32) with the tines (16) are arranged on the chassis (8) in an alignment relationship to the cross-connectors (9, 9a, 10, 11).

* * * * *